United States Patent

[11] 3,596,513

[72] Inventor Gary O. Sandstedt
 Kansas City, Mo.
[21] Appl. No. 6,237
[22] Filed Jan. 27, 1970
[45] Patented Aug. 3, 1971
[73] Assignee Roger H. Finch
 Silver Spring, Md.

[54] SPEEDOMETER FOR BOATS
 14 Claims, 5 Drawing Figs.
[52] U.S. Cl. .................................................. 73/181,
 73/228, 250/231
[51] Int. Cl. ................................................. G01c 21/00
[50] Field of Search .......................................... 73/186,
 181, 228; 356/152; 250/231 P

[56] References Cited
UNITED STATES PATENTS
2,178,422  10/1939  Heagney ........................ 73/181
Primary Examiner—Donald O. Woodiel
Attorney—Brady, O'Boyle and Gates ABSTRACT: A boat speedometer embodies a radiant energy source and a receiver means which is responsive to radiant energy and produces an output. A speed indicator means is coupled to the receiver means. Another means responsive to water pressure caused by movement of the boat in the water produces changes in the response effect of the receiver means in accordance with speed variations of the boat.

PATENTED AUG 3 1971 3,596,513

INVENTOR
GARY O. SANDSTEDT

BY Brady, O'Boyle & Gates

ATTORNEYS

SPEEDOMETER FOR BOATS

BACKGROUND

Speedometers for boats are known in the prior art including some electromagnetic devices and devices which embody a strain gage in association with an element projecting into the water. In general, the prior boat speedometers have been unduly expensive when sufficiently accurate to be practical. More economical versions are inaccurate or do not possess a desired measure of linearity or suffer from other similar deficiencies.

The objective of the present invention is to cure all of the deficiencies of the prior art by the provision of an economical and wholly practical boat speedometer which is reliable and accurate over a wide speed range and also possesses excellent linearity over this range. The device operates on a principle which departs from the prior art practices and results in a much more simplified instrument and one which is more reliable. The small unit embodying the invention is installable within a small opening in the boat bottom and permits servicing and/or replacement of the main operating assembly of the speedometer while the boat is in the water. Only a very small extension of the device projects slightly below the boat bottom substantially eliminating any tendency for fouling on weeds or other objects which commonly results in the disabling or outright destruction of some prior art speedometers.

Other objectives and advantages of the invention will appear to those skilled in the art during the course of the following detailed description.

DESCRIPTION OF DRAWING FIGURES

DETAILED DESCRIPTION

Figure 1:
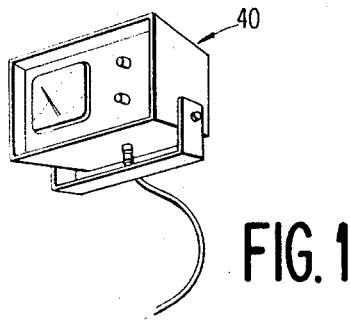
FIG. 1 is a perspective view showing a speedometer for boats embodying the invention.

Referring to the drawings in detail, the numeral 10 designates a fragment of a boat bottom having a small opening 11 formed therethrough to receive an external mounting sleeve 12 forming a housing and support member for an internal assembly, to be described. The sleeve 12 is open at its lower end and has a lower marginal flange 13 secured firmly to the boat bottom as by screws 14 with a watertight gasket 15 intervened between the flange and the boat bottom. An internal sleeve 16 is disposed within the sleeve or housing 12 in concentric relation thereto and has its upper end rigidly secured to a cover disc 17 having its marginal edge portion engaged by a clamping nut 18 having screw-threaded engagement with the upper end of the outer sleeve 12. A compressible gasket 19 is interposed between the disc 17 and the top of sleeve 12 to form another watertight joint. Water is free to enter the bore of sleeve 12 surrounding the interior sleeve 16 but is excluded from entering the sleeve 16 by the sealing arrangement.

The lower end of internal sleeve 16 carries an angled head 20 whose forward face 21 is preferably disposed at 45 degrees to the horizontal. This forward face 21 is transverse to the longitudinal axis of the boat and to the direction of movement of the boat. Any conventional simplified means, not shown, to properly index the head 20 and sleeve 16 relative to the boat may be included, such as visible markings on the disc 17 and outer sleeve 12, which may be aligned at the time of assembling the device, or some simple interengaging projection means on the sleeves 12 and 16 which may be rotated into contact at the time of assembly.

The head 20 carries a horizontal flange 22 which is suitably secured to a mating flange 23 on the bottom of sleeve 16 with another watertight gasket 24 disposed between the two flanges under compression. The opening in the forward face 21 of head 20 is spanned and covered by an elastic diaphragm 25 which remains taut and flat when the boat is at rest, FIG. 2, and which flexes and becomes concave in varying degrees responsive to movement of the boat through the water at various speeds. The head 20 and the diaphragm 25 project below the bottom of the boat for a relatively small distance, as shown in the drawings, and the total projection below the boat bottom can be held to less than one inch which is desirable to avoid fouling and striking obstructions in the water. The rectangular diaphragm 25 need only be in the range of three-fourths inch by five-eights inch in size to be effective and to render the speedometer sufficiently sensitive for practical use and this is one of the advantages of the invention.

Figure 3:
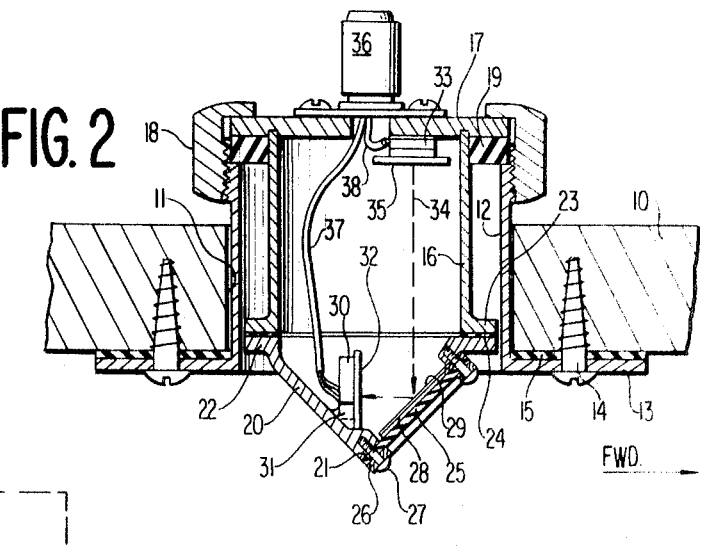
FIG. 3 is a lower end elevation of the structure shown in FIG. 2.
Figure 3:
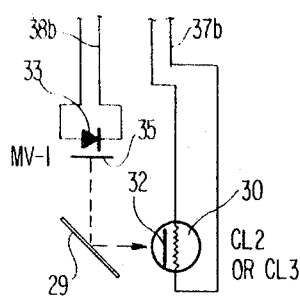

The diaphragm 25 is secured in fluidtight engagement against the inclined face 21 by a clamping ring 26 and suitable fasteners 27 and a small leaf spring or reed 28 is disposed immediately inwardly of the diaphragm 25 and extends substantially across the mouth of the head 20 behind the diaphragm and has one end anchored to the face 21 by means of one of the fasteners 27. The reed 28, as shown in FIG. 3, may be relatively narrow compared to the total width of the elastic diaphragm 25. The opposite end of the reed is freely disposed and the reed may deflect or bend about its attached end in response to flexure of the diaphragm 25 when the boat moves through the water. This will of course vary the angle of the reed 28 responsive to changes in speed of the boat. As will be further discussed, the reed is capable of flexing through an arc of approximately 15 degrees and this degree of flexure is adequate for proper operation of the speedometer. The reed may be formed of phosphor bronze, berillium copper, stainless steel, or the like.

The interior face of the reed 28 is rendered reflective preferably by the application of a thin layer 29 of glossy mylar or the like. Other forms of reflective surfaces may be employed as found desirable.

Mounted within the interior chamber of the head 20 in opposed relation to the reed 28 in a vertical plane is a photoelectric cell 30. This element may be secured in any convenient manner as with epoxy cement 31 or other suitable means. The photocell 30, in order to provide proper linearity in the speedometer, has a target compensation pattern on its active face and this target compensation pattern is of a well-known type such as a photographic pattern to provide linearity in the response of the cell to radiant energy or light. Various types of compensated photocells are available and one suitable device is sold by Clairex Electronics, Inc., New York, N.Y. A conventional polarized light analyzer 32 is also provided between the active face of the photocell 30 and the reflective surface of the reed 28.

Figure 2:
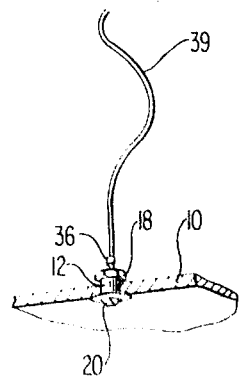
FIG. 2 is an enlarged central vertical section through the portion of the device which attaches to the bottom of the boat and responds to the movement of the boat in the water.

A radiant energy emitting device such as a light emitting diode 33 is suitably anchored to the bottom of disc 17 within the interior sleeve 16 with its vertical optical axis 34 aligned substantially with the center of the reflective reed 28, such axis being offset from the center axis of the sleeve 16. A conventional polarizer 35 is provided below the light emitting diode to assure parallel light rays impinging on the reflective element 29 and to eliminate stray light rays. A suitable waterproof connector 36 is mounted upon the disc 17 to receive the wires 37 and 38 from the photocell 32 and light emitting diode 33, as shown in FIG. 2. A cable 39 leads from the connector 36 to the remote speedometer 40 proper, located at any convenient place on the boat. Speedometer 40 is preferably in the form of a milliammeter and this meter can be quite small in physical size, as is well known.

Figure 5:
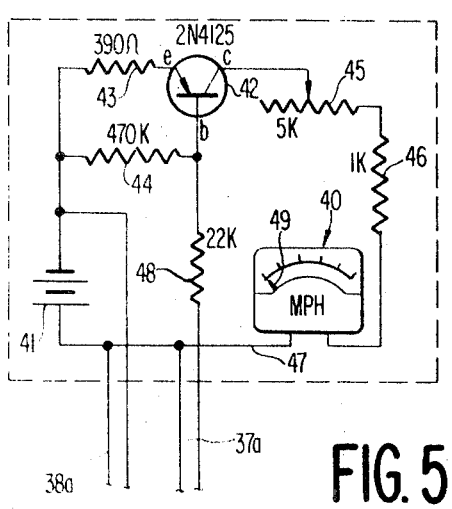
FIG. 5 is a schematic view of an electro-optical circuit embodied in the speedometer.

Referring to FIG. 5, the optical and electronics components of the boat speedometer are shown schematically. A source of current in the form of a battery 41 is provided, said battery being electrically connected across the terminals of the light emitting diode 33 by the lead wires 38a and 38b, as shown. An amplifier circuit is provided between the photocell 30 and the milliammeter 40 including a transistor 42, an emitter resistor 43 and a base bias resistor 44. The collector of the transistor 42 is connected with a variable resistance 45 connected in series with another resistance 46, in turn connected to one terminal of the milliammeter 40 which serves as the readout element of the speedometer. The other terminal of the milliammeter 40 is connected back to the battery 41 by a wire 47 also connected with a wire 37a leading to one terminal of the photocell 30, the opposite terminal lead or wire 37b of which is connected to the base of the transistor with another resistor 48 connected in the wire 37b. The battery and the components of the amplifier circuit may all be conveniently housed in one unit with the milliammeter 40, as depicted in FIG. 1, remote from the elements associated with the sleeve 16.

A feature of the construction shown in FIG. 2 is that the entire internal unit composed of the sleeve 16 and all parts carried thereby may be removed bodily through the top of the outer sleeve 12 by removing the nut 18. This may be done without removing the boat from the water by simply utilizing another cap or closure on the sleeve 12 to stop the inflow of water. The arrangement is very simplified and facilitates the servicing or replacement of the unit embodying the light emitting diode 33, photocell 30 and associated parts.

OPERATION

When the boat stationary and there is no flexure of diaphragm 25 and no bending of generated reflector 28—29, light from the source 33 will be reflected by the reed substantially 90° onto the photocell 30 and will impinge on the marginal portion of the photocell where its target compensation pattern will cause very little current to be generated. Under these conditions, the resistance of the photocell will be high and its response to the light will be at a minimum. However, there will always be a trickle current generated by the photocell and this current will be applied to the amplifier circuit even when the boat is stationary. Therefore, the speed indicator needle 49 of milliammeter 40 should be zeroed on the speed indicating scale and should remain at zero on the scale when the trickle current is flowing. The speed indicator scale on the milliammeter may have a range from 0 to 50 or more miles per hour, as shown in FIG. 5, or the scale may be graduated, if preferred, in nautical miles or knots.

As the speed of the boat increases, inward flexure of the diaphragm 25 will occur increasingly with a corresponding bending of the reed reflector 28—29. This will have the effect of changing the point of incidence of reflected light on the photocell 30 increasingly toward the center thereof where the resistance of the photocell will be decreased and the current flowing therefrom will be increased. Such increased current will flow through the amplifier circuit and cause the transistor 42 to become further conductive and consequently the needle 49 of the milliammeter 40 will move to a correspondingly higher point on the speed indicator scale. Linearity of the instrument is achieved by proper design of the reed 28 and proper selection of material therefor.

Figure 4:
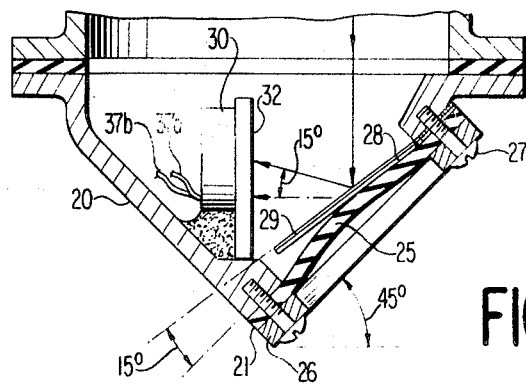
FIG. 4 is a considerably enlarged fragmentary vertical section through the lower projecting end portion of the device and the operating parts therein.

As indicated diagrammatically in FIG. 4, the total angle of sweep of the reflected light across the photocell 30 from the trickle current generating point with no bending of the reed to the maximum current generating point corresponding to maximum bending of the reed will be approximately 15°. This range is entirely sufficient to cause the milliammeter 40 to respond with sensitivity and good linearity.

Essentially, therefore, the boat speedometer embodies a radiant energy source, a receiver-amplifier means which responds to the radiant energy, a speed indicator means coupled with the receiver-amplifier means, and another means which responds to movement of the boat in the water and basically to the pressure of the water caused by such movement to vary the incidence of the radiant energy on the receiver-amplifier means so that the latter will respond between minimum and maximum output limits. It is believed that the advantages of the invention over the known prior art are now readily apparent in light of the above description.

It is to be understood that the form of the invention herewith shown and described is to be taken as a preferred example of the same, and that various changes in the shape, size and arrangement of parts may be restored to.

I claim:

1. A boat speedometer comprising a radiant energy source, receiver means adapted to respond to said radiant energy and producing an output, speed indicator means connected with the receiver means and responsive to the output thereof to indicate the speed of movement of the boat in water over a range of speeds, and another means responsive to water pressure induced by movement of the boat to vary the response effect of said radiant energy on said receiver means in accordance with speed changes of the boat.

2. The structure of claim 1 and said water pressure-responsive means interposed between said radiant energy source and said receiver means and intercepting radiant energy and varying the incidence of or quantum of the radiant energy on the receiver means.

3. The structure of claim 2, wherein said radiant energy source is a light source and said receiver means comprises an electro-optical receiver-amplifier which responds to light to produce an output.

4. The structure of claim 3, and said water pressure responsive means including a movable reflector of light capable of changing the point of incidence of the light on said receiver-amplifier.

5. The structure of claim 4, and said receiver-amplifier including a receiver component in the form of a photoelectric cell.

6. The structure of claim 3, and said water pressure responsive means including a movable reflector element, said receiver-amplifier including a receiver element in the form of a photosensitive cell positioned to receive light from the reflector element, and an electrical amplifier circuit interconnecting the photosensitive cell and said speed indicator means so that the electrical output of the call may be amplified and transmitted to the indicator means.

7. The structure of claim 6, and said indicator means comprising a milliammeter having an indicator scale thereon calibrated in speed increments, said amplifier circuit including a transistor whose base is connected serially with the photosensitive cell and whose conductance increases as the resistance of the cell decreases in response to increasing exposure to light from said source.

8. The structure of claim 7, and said light source comprises a light emitting diode.

9. The structure of claim 2, and said water pressure-responsive means comprising an elastic diaphragm disposed generally transverse to the normal direction of the boat in the water, and a radiant energy intercepting and reflecting element adjacent the diaphragm and being moved by flexure of the diaphragm in response to water pressure.

10. The structure of claim 9, and said radiant energy source being a light source, said reflecting element comprising a bendable reed disposed immediately inwardly of said elastic diaphragm and having a light reflecting face disposed obliquely to the axes of the light source and said receiver means, the receiver means including a light sensitive energy producing component receiving light from said light reflecting face.

11. The structure of claim 10, and said bendable reed being a metallic reed anchored at one end only and being bendable about such anchored end and extending across said diaphragm for a substantial portion of the width of the latter.

12. The structure of claim 11, and said light reflecting face comprising a thin light reflecting plastic layer bonded to the interior face of said reed.

13. The structure of claim 2, and supporting means in the form of a sealed container for the radiant energy source and at least a part of the receiver means, said supporting means also carrying said water pressure responsive means, and additional means to secure the supporting means to the bottom of a boat so that the pressure responsive means will project into the water below the boat bottom.

14. The structure of claim 13, and said additional means comprising an exterior sleeve member surrounding the supporting means and being anchored to the boat bottom, and releasable sealed connector means between said supporting means and sleeve member allowing the supporting means to be separated from the boat as a unit without the necessity of removing the boat from the water.